(12) United States Patent
Watanabe et al.

(10) Patent No.: US 7,401,065 B2
(45) Date of Patent: Jul. 15, 2008

(54) SYSTEM FOR DOWNLOADING CONTENTS, AND CLIENT TERMINAL FOR DOWNLOADING CONTENTS FROM CONTENTS SERVER

(75) Inventors: Keiko Watanabe, Tokyo (JP); Jun Sato, Kanagawa-ken (JP); Toru Terauchi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 270 days.

(21) Appl. No.: 11/197,182

(22) Filed: Aug. 4, 2005

(65) Prior Publication Data

US 2006/0036573 A1    Feb. 16, 2006

(30) Foreign Application Priority Data

Aug. 6, 2004    (JP) ............................. 2004-231386

(51) Int. Cl.
    *G06F 17/30* (2006.01)
    *G06F 15/16* (2006.01)
(52) U.S. Cl. ............................................ 707/1; 707/10
(58) Field of Classification Search ................ 707/1, 707/10
    See application file for complete search history.

(56) References Cited

U.S. PATENT DOCUMENTS

| | | | |
|---|---|---|---|
| 6,785,716 B1 | 8/2004 | Nobakht | |
| 2004/0176080 A1* | 9/2004 | Chakravorty et al. | 455/414.1 |

FOREIGN PATENT DOCUMENTS

| | | |
|---|---|---|
| JP | 2001-290476 A | 10/2001 |
| JP | 2003-216430 A | 7/2003 |
| JP | 2003-316639 A | 11/2003 |
| WO | WO 01/56291 A2 | 8/2001 |
| WO | WO 02/11392 A2 | 2/2002 |
| WO | WO 02/41147 A1 | 5/2002 |
| WO | WO 03/085923 A1 | 10/2003 |

OTHER PUBLICATIONS

Open Mobile Alliance: Generic Content Download Over The Air Specification, Version 1.0, Jun. 20, 2002, Announcement Open Mobile Alliance, pp. 1-40, XP002264099.
Japanese Office Action dated Feb. 5, 2008, issued in counterpart Japanese Application 2004-231386.

* cited by examiner

*Primary Examiner*—Tony Mahmoudi
(74) *Attorney, Agent, or Firm*—Frishauf, Holtz, Goodman & Chick, P.C.

(57) ABSTRACT

A download control program of a client terminal transmits a request to a download server, which stores Download Descriptors that include attribution information of contents, for a Download Descriptor, and receives the Download Descriptor from the download server. The download server, before transmitting the Download Descriptor to the client terminal, adds information indicating that there is a difference between a Download Descriptor contained in the request from the client terminal and the Download Descriptor stored in data memory of the download server if the download server detects the difference between them. The client terminal transmits a content download request to a contents server based on the received Download Descriptor.

14 Claims, 14 Drawing Sheets

|  | 1st type of DD |
|---|---|
| 51a DD identifier | |
| 51b Classification | 1st type |
| 51c Version | |
| 51d Data type | |
| 51e Size | |
| 51f URI | |
| 51g Success-failure URI | |
| 51h Display URI | |
| 51i Version | |
| 51j Revision date | |
| 51k Title | |
| 51m Explanation | |
| 51n Vendor name | |
| 51o Explanation URI | |
| 51p Icon URI | |
| 51q Parameter | |

Fig. 5

| Basic DD | |
|---|---|
| DD identifier | |
| Classification | 2nd type |
| Version | |
| Data type | No data |
| Size | No data |
| URI | No data |
| Success-failure URI | |
| Display URI | |
| Version | No data |
| Revision date | No data |
| Title | |
| Explanation | |
| Vendor name | |
| Explanation URI | |
| Icon URI | |
| Parameter | No data |

Fig. 6(a)

| | Object DD | | |
|---|---|---|---|
| 52a Object DD identifier | | | |
| 52b Data type | | | |
| 52c Size | | | |
| 52d URI | | | |
| 52e Version | | | |
| 52f Revision date | | | |
| 52g Title | | | |
| 52h Explanation | | | |
| 52i Vendor name | | | |
| 52j Explanation URI | | | |
| 52k Parameter | | | |
| 52m Flag | | | |

Fig. 6(b)

| | Basic DD | |
|---|---|---|
| 51a | DD identifier | |
| 51b | Classification | 3rd type |
| 51c | Version | |
| 51d | Data type | No data |
| 51e | Size | No data |
| 51f | URI | No data |
| 51g | Success-failure URI | |
| 51h | Display URI | |
| 51i | Version | No data |
| 51j | Revision date | No data |
| 51k | Title | |
| 51m | Explanation | |
| 51n | Vendor name | |
| 51o | Explanation URI | |
| 51p | Icon URI | |
| 51q | Parameter | No data |

SYSTEM FOR DOWNLOADING CONTENTS, AND CLIENT TERMINAL FOR DOWNLOADING CONTENTS FROM CONTENTS SERVER

CROSS REFERENCE TO RELATED APPLICATION

This application is based upon and claims the benefit of priority of the prior Japanese Patent Application No. 2004-231386, filed Aug. 6, 2004, the entire contents of which are incorporated herein by reference.

FIELD OF THE INVENTION

This invention relates to a client terminal for downloading contents from a contents server, and a contents download system which comprises the client terminal and the contents server.

DESCRIPTION OF THE BACKGROUND

There are the Download Over The Air standardized by the OMA (Open Mobile Alliance) and the OTA (Over The Air) of MIDP (Mobile Information Device Profile), which define the scheme for a client terminal, for instance a mobile phone, to download contents from a contents server.

Especially, these standards define that the client terminal receives a Download Descriptor (hereinafter "DD"), which describes attribution information of the contents, before downloading contents, and the client terminal downloads the contents from the contents server based upon the URI (Uniform Resource Identifier) contained in the DD.

The contents to be downloaded from the contents sever are a movie, music, and a game program, etc.

By the way, in order to avoid the load of unnecessary fee collection or a network, it is desirable that the client terminal does not download the same contents as contents which the client has already downloaded from the contents server.

For example, Japanese Patent Disclosure (Kokai) No. 2003-216430 discloses a system where upgrade of unnecessary software is not performed. In this system, which consists of a client terminal and a server, the client terminal stores the operating frequency of each software, and client terminal requests the server to upgrade only software with high operating frequency for reducing useless access to the server.

However, if there are two or more contents from which only voice information differs, the above-mentioned scheme cannot solve the problem. That is, although it is desirable to download only the voice information in Japanese if the client terminal has already downloaded the content with image information and voice information in English, a scheme for downloading only voice information in Japanese is not provided.

SUMMARY OF THE INVENTION

An object of the present invention is to provide a client terminal and contents download system for downloading a required information without a complicated process.

According to an aspect of the present invention, a contents download system is provided which includes a client terminal, a download server, and a contents server. The client terminal includes: (i) a first storage unit configured to store a content and a download descriptor which contains attribution information regarding the content, (ii) means for transmitting a request for a download descriptor to a download server, wherein the request includes at least one download descriptor stored in the first storage unit, (iii) means for receiving the download descriptor from the download server, and (iv) means for transmitting a request for a content to the content server if difference information is added to the received download descriptor. The download server includes: (i) a second storage unit configured to store download descriptors, each of which contains attribution information regarding a content, (ii) means for receiving the request for a download descriptor from the client terminal, (iii) means for comparing the at least one download descriptor contained in the request and the download descriptor stored in the second storage unit, (iv) means for adding the difference information to the download descriptor if there is a difference between the download descriptor from the client terminal and the download descriptor stored in the second storage unit, and (v) means for transmitting the download descriptor having the difference information added thereto. The contents server includes: (i) a third storage unit configured to store contents, (ii) means for receiving the request for a content from the client terminal, and (iii) means for transmitting the requested content to the client terminal.

According to another aspect of the present invention, a client terminal used in a contents download system is provided, which includes: (i) a storage unit configured to store a content and a download descriptor which contains attribution information regarding the content, (ii) means for transmitting a request for a download descriptor to a download server, (iii) means for receiving the download descriptor from the download server, and (iv) means for transmitting a request for a content to the content server if a difference information is added to the received download descriptor.

BRIEF DESCRIPTION OF THE DRAWINGS

FIG. 5 shows a format of a first type of Download Descriptor used by the download system of this invention.

FIGS. 6(a) and 6(b) show a format of a second type of Download Descriptor used by the download system of this invention.

FIGS. 7(a) and 7(b) show a format of a third type of Download Descriptor used by the download system of this invention.

DETAILED DESCRIPTION OF THE INVENTION

Hereinafter, referring to the accompanying drawings, an embodiment of the present invention will be explained.

Figure 1:
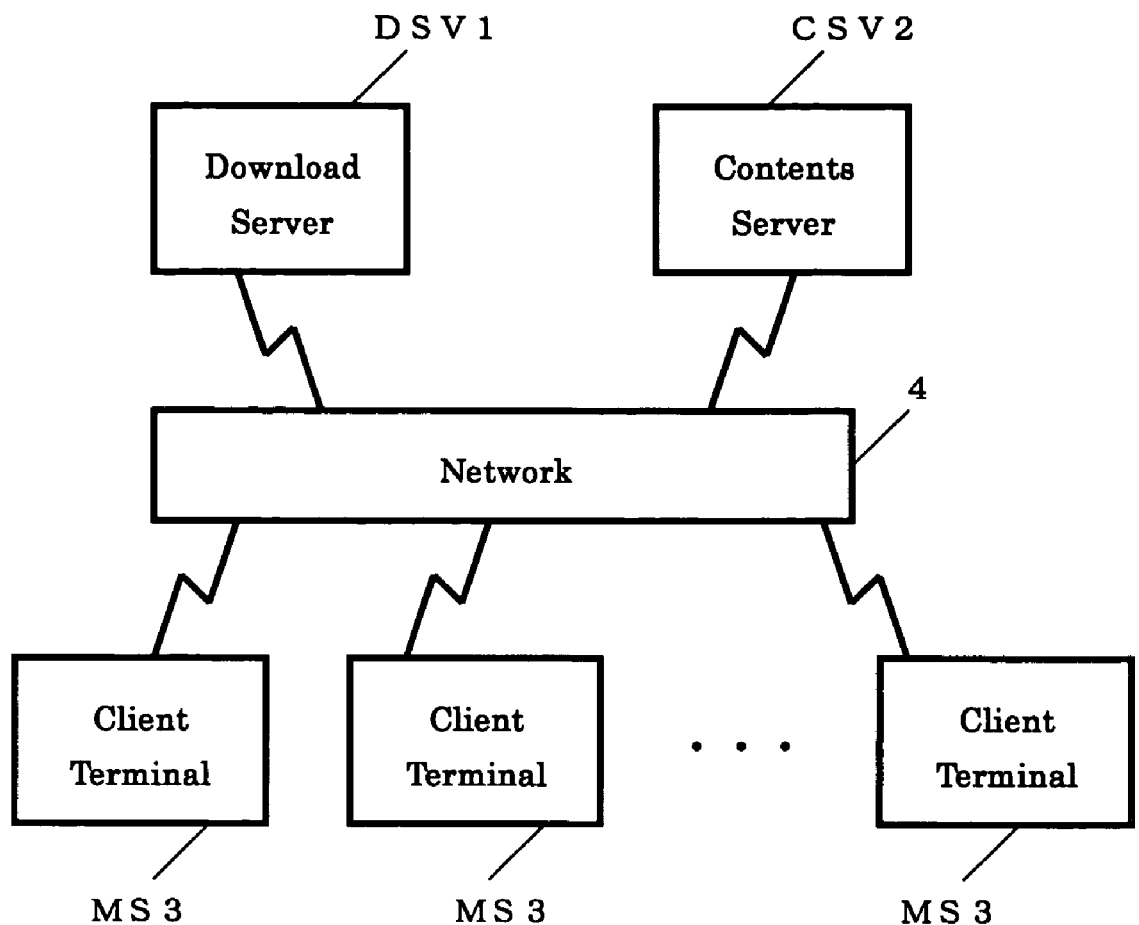
FIG. 1 shows an exemplarily configuration of a download system of this invention.

FIG. 1 shows a contents download system according to an embodiment of the present invention. The contents download system comprises a download server DSV 1, a contents server CSV 2, and mobile communication terminals MSs 3, where the DSV 1, the CSV 2, and the MSs 3 are connected via network 4. Although not shown in FIG. 1, the network 4 includes the Internet and the cellular network.

Figure 2:
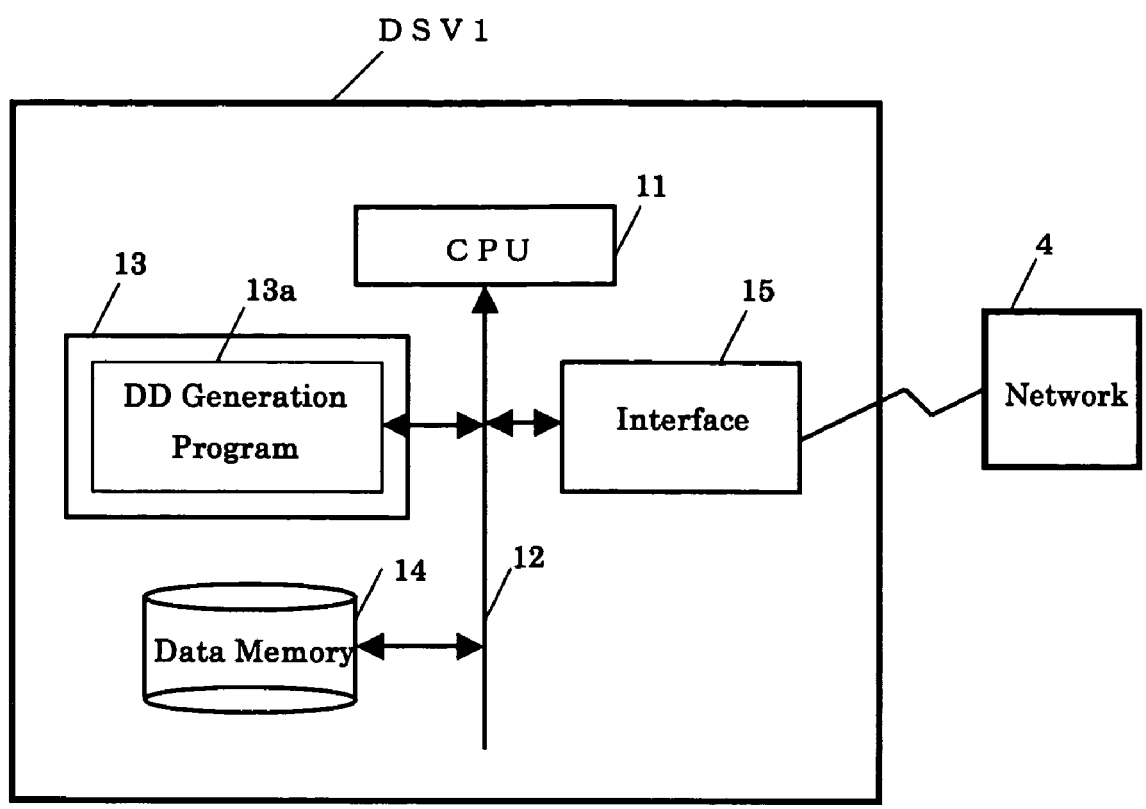
FIG. 2 shows a configuration of a download server.

FIG. 2 schematically shows the configuration of the DSV 1. The DSV 1 has a function to manage attribution information regarding contents, which are to be downloaded, stored in the CSV 2, and comprises a CPU (Central Processing Unit) 11, a data bus 12, a program memory 13, a data memory 14, and an interface 15. The program memory 13 stores DD generation program 13a for generating the Download Descriptor DD and a transmission/reception control program for receiving the DD transmission request from a MS 3 and transmitting the DD to the MS 3. The DD generated based upon the DD generation program 13a is stored in the data memory 14.

The data memory 14 may be a flash memory or hard disk, and stores the DDs, which include the attribution information of the contents and indicators of the content.

Figure 3:
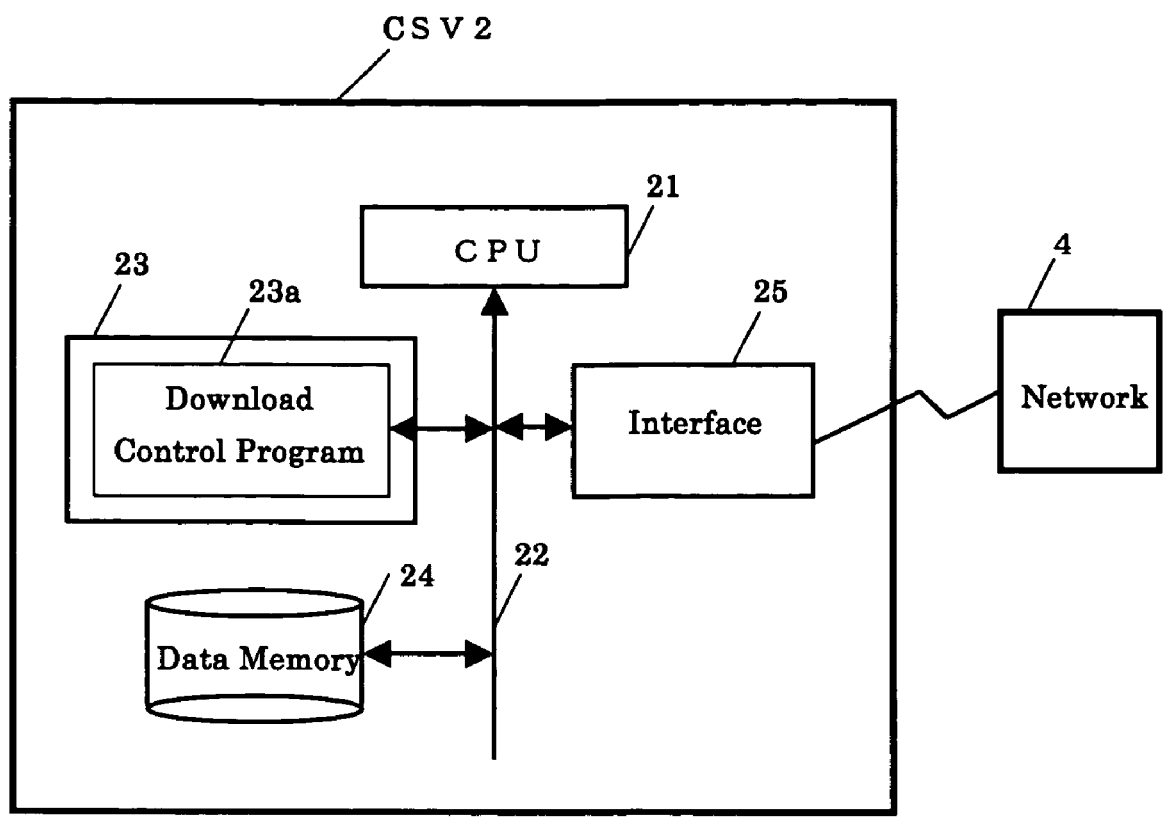
FIG. 3 shows configuration of a contents sever.

FIG. 3 schematically shows the configuration of the CSV 2. The CSV 2 has a function to manage the contents, which are to be downloaded responding to a download request from the MS 3, and comprises a CPU 21, a data bus 22, a program memory 23, a data memory 24, and an interface 25. The contents to be downloaded are stored in the data memory 24.

The program memory 23 stores download control program 23a. A content requested by a MS 3 is transmitted to the MS 3 by executing the download control program 23a.

Figure 4:
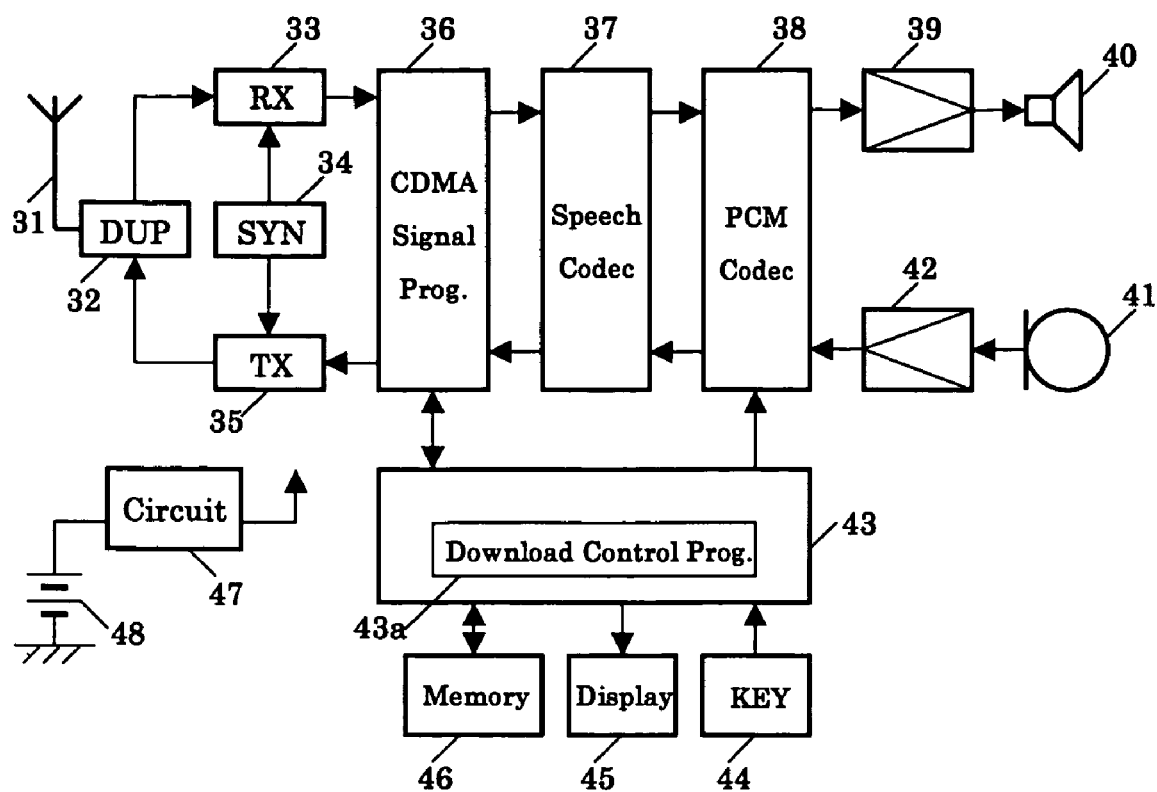
FIG. 4 shows a configuration of a client terminal.

FIG. 4 schematically shows the configuration of the MS 3. Each MS 3 has a radio processing part and a signal processing part. The radio processing part comprises an antenna 31, a duplexer 32, a receiving circuit 33, a synthesizer 34, and a transmitting circuit 35. The signal processing part comprises a CDMA signal processing unit 36, a speech codec 37, and a PCM codec 38.

The PCM codec 38 demodulates a digital speech signal from the CDMA signal processing unit 36 and outputs an analog speech signal to an amplifier 39. And the analog speech signal, amplified by the amplifier 39, is outputted from a speaker 40. On the other hand, an input speech signal from a microphone 41 is amplified by the amplifier 42 and modulated by the PCM codec 38.

The CDMA signal processing unit 36 despreads a packed data from receiving circuit 33 and outputs to the controller 43. The controller 43 extracts a content from the packed data based upon header information embedded in the packed data. The extracted content is stored in the memory 46.

The controller 43 reads out a content based upon the execution request inputted from the input unit 44, and outputs image data included in the content to the display unit 45 and outputs voice data included in the content to the PCM codec 38 and amplifier 39 sequentially. Then, the image data is displayed on the display unit 45 and voice data is outputted from the speaker 40. On the other hand, controller 43 outputs a download request inputted by the input unit 44 to the CDMA signal processing unit 36.

The CDMA signal processing unit 36 spreads a coded speech data, using a spreading code assigned for communicating with a base station (not shown), from the speech codec 37 and orthogonally modulates the spread speech data. Then, the orthogonally modulated speech data is outputted to the base station via the antenna 31.

The input unit 44 has digit keys, a power ON key, a SEND key, an END key, a volume key, and a mode selection key.

The display unit 45 has a LCD display unit and a LED, and the LCD display unit displays image data of the content stored in the memory 46, a telephone number and a name of a caller, and a status information regarding the MS 3.

The power circuit 47, which is equipped with a DC/DC converter, supplies a predetermined voltage Vcc, made from the power stored in a battery 48, to each circuit of MS By the way, the controller 43 includes a microcomputer and a ROM (Read Only Memory), and download control program 43a is stored in the ROM.

The controller 43, by executing the download control program 43a, transmits a DD transmission request to the DSV 1 and transmits a content transmission request (a download request) to the CSV 2, respectively. Furthermore, the controller 43 stores the DD received from the DSV 1 and the content received from the CSV 2 in the memory 46.

Then, the DD will be explained. In this embodiment, there are three kinds of DDs. FIG. 5 shows information included in the first type of DD. This first type of DD is used if the content cannot be divided into sub-contents. For example, each sub-content is one of the chapters of one story.

The first type of DD includes DD identifier 51a, DD classification 51b, DD version 51c, data type 51d, size 51e, URI 51f, success-failure URI 51g, display URI 51h, version 51i, revision date 51j, title 51k, explanation 51m, vendor name 51n, explanation URI 51o, icon URI 51p, and parameter 51q.

The DD identifier 51a is identification information, for example a serial number, to identify this DD. The DD classification 51b indicates that this DD is the first type of DD. The DD version 51c means the version of the first type of DD. The data type 51d indicates the coding method, for example, MPEG-4 and MP3, used for coding data included in the content.

The size 51e indicates memory size required for storing the content which the first type of DD designates. The URI 51f indicates location information of the CSV 2. The success-failure URI 51g indicates location information used by the MS 3 for a notice of the information regarding whether the content has been downloaded completely or not. The display URI 51h indicates location information which is used by the MS 3 to obtain display data to be displayed on the LCD display unit if the MS 3 has downloaded the content completely. The version 51i indicates the version of the content. The revision date 51j indicates latest revision date of this content.

The title 51k indicates the title of this content which this first type of DD designates. The explanation 51m is information explaining this content. The vendor 51n indicates a contents provider of this content. The explanation URI 51o indicates location information which is used by the MS 3 to obtain the information explaining this content. The icon URI 51p indicates location information which is used by the MS 3 to obtain an icon image to be displayed with respect to this content. The parameter 51q is a parameter used in case MS 3 executes this content.

FIG. 6 shows information included in the second type of DD, which can be divided into at least two sub-contents but is not executed unless all sub-contents are assembled. The sub-content described in this embodiment is called an object. The second type of DD consists of the basic DD as shown in FIG. 6(a) and the object DD as shown in FIG. 6(b).

Although the basic DD of the second type of DD has the same information as the first type of DD, data type 51d, size 51e, and URI 51f are not used. In this example, the information corresponding to the data type 51d, the size 51e, and the URI 51f is included in the object DD.

On the other hand, the object DD of the second type of DD includes object DD identifier 52a, data type 52b, size 52c, URI 52d, version 52e, revision date 52f, title 52g, explanation 52h, vendor name 52i, explanation URI 52j, parameter 52k, and flag 52*m*. Since one object DD supports one object, if one content includes two or more objects, there are as many object DDs as the objects.

The object identifier 52*a* is identification information, for example a serial number, to identify this object DD. The data type 52*b* indicates the coding method, for example, MPEG-4 and MP3, used for coding data included in the object. The size 52*c* indicates memory size required for storing the object which the object DD designates. The URI 52*d* indicates location information of CSV 2 which stores the object designated by this object DD. The version 52*e* indicates the version of the object. The revision date 52*f* indicates a latest revision date of this object.

The title 52*g* indicates the title of this object which this object DD designates. The explanation 52*h* is information explaining this object. The vendor 52*i* indicates a content provider of this object. The parameter 52*k* is a parameter used in case MS 3 executes this object. The flag 52*m* indicates that the content designated by the basic DD is not executed. as described above. That is, all objects included in the second type of DD are necessary for execution.

This second type of DD, for example, is used in case the content to be downloaded consists of an image object and a voice object. For example, if the content includes image data, voice data in English, and voice data in Japanese, there are three object DDs.

Figure 7B:
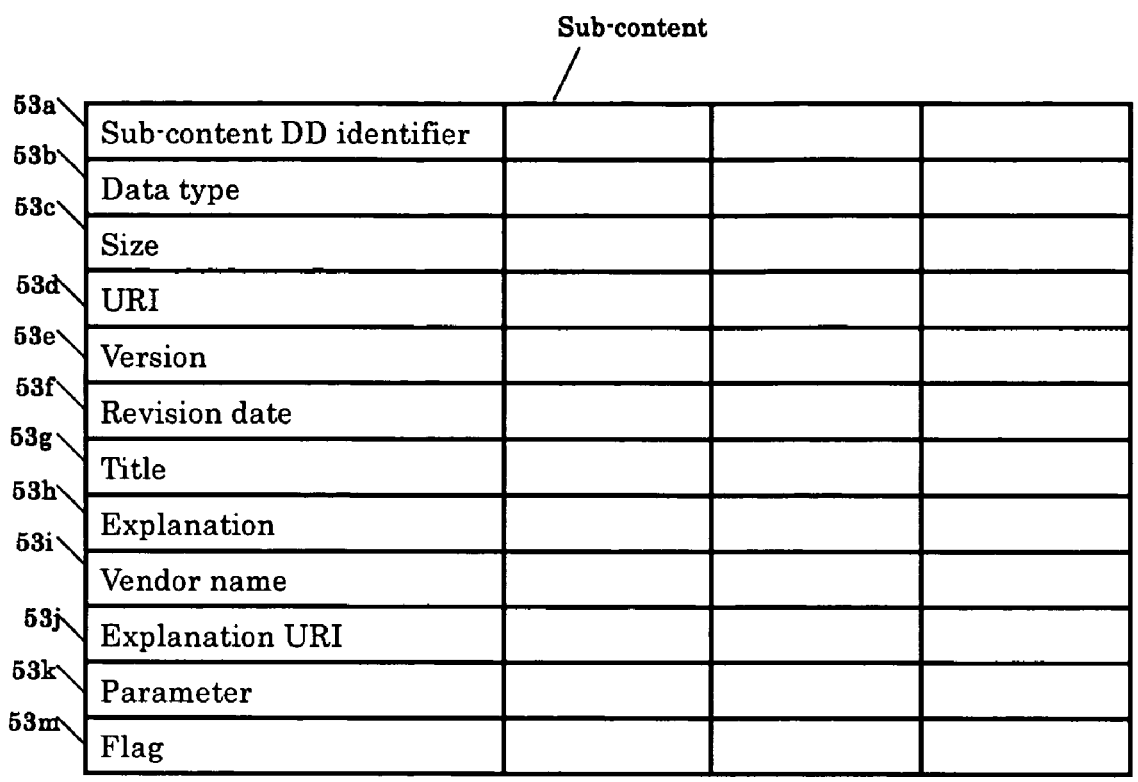

FIG. 7 shows information included in the third type of DD, which can be divided into at least two sub-contents. In this case, it is possible to choose one sub-content contained in a content and execute the chosen sub-content. The third type of DD consists of the basic DD as shown in FIG. 7(*a*) and sub-content DD as shown in FIG. 7(*b*). Though the third type of DD has the same information as the second type of DD, sub-content DD of the third type of DD does not include an object identifier 52*a* but a content identifier 53*a*. That is, the sub-content DD includes sub-content DD identifier 53*a*, data type 53*b*, size 53*c*, URI 53*d*, version 53*e*, revision date 53*f*, title 53*g*, explanation 53*h*, vendor name 53*i*, explanation URI 53*j*, parameter 53*k*, and flag 53*m*.

A content designated by the third type of DD consists of two downloadable sub-contents, for example, one sub-content is the first part of a movie and another sub-content is the last part of the same movie.

Next, operation of the above-mentioned download system is explained

First Embodiment

Figure 8:
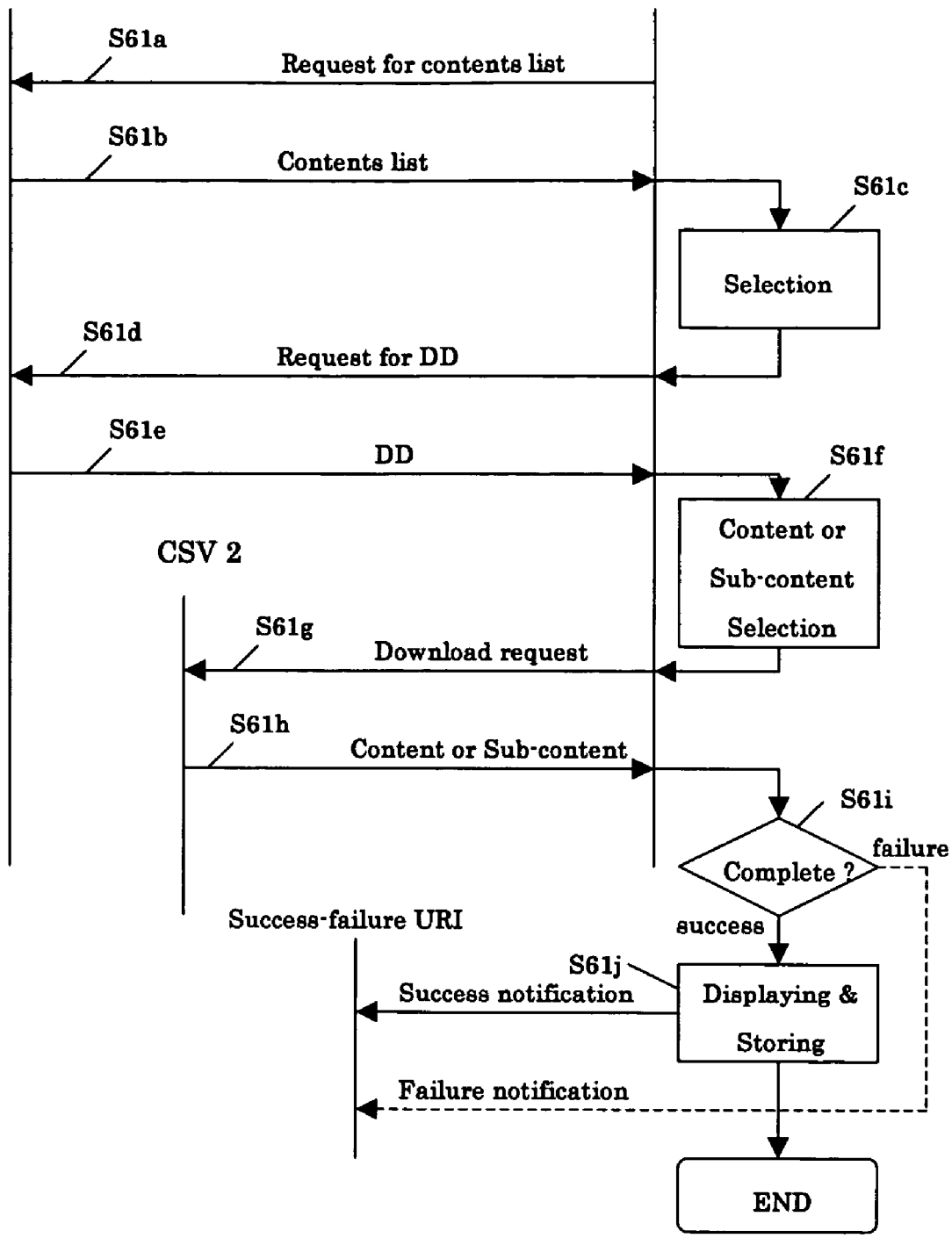
FIG. 8 shows a sequence of download processing performed by the download system of the first embodiment.

FIG. 8 shows the operation of the download system of the first embodiment. Firstly, a user inputs a contents list download request by using the input unit 44. When the download control program 43*a* receives the contents list download request, MS 3 requests a contents list from the DSV 1 (STEP S61*a*).

When the DSV 1 receives the request, the DD generation program 13*a* of the DSV 1 creates a contents list and transmits this contents list to MS 3 (STEP S61*b*). This contents list includes partial information of the first type of DD. This partial information at least includes DD identifier 51*a* and title 51*k*. Further, The contents list may include partial information, for example, title 52*g* or 53*g*, of the object DD or the sub-content DD.

When the download control program 43*a* of the MS 3 receives the content list from the DSV 1, content information contained in the content list is displayed on the LCD display unit. If one of the contents is selected by using the input unit 44 (STEP S61*c*), the download control program 43*a* extracts the DD identifier 51*a* from the received contents list and requests the DD corresponding to the selected content from the DSV 1 (STEP S61*d*).

When the DSV 1 receives the request from the MS 3, the DD generation program 13*a* of the DSV 1 reads out the requested DD from the data memory 14 and transmits this DD to the MS 3 (STEP S61*e*). Moreover, the DSV 1 may transmit the DD to the MS 3 automatically, if the DD is updated and the MS 3 requested this DD before.

The MS 3 receives the DD from the DSV 1, and the download control program 43*a* of the MS 3 checks whether the same content designated by the received DD is stored in the memory 46 or not. If the same content is not stored in the memory 46, the download control program 43*a* decides that the content designated by the DD should be downloaded. On the other hand, if the same content is stored in the memory 46, the download control program 43*a* checks whether there is a DD in the memory 46 coincident with the DD from the DSV 1 and decides whether a content should be downloaded or a sub-content should be downloaded (STEP S61*f*). Meanwhile, a judgment of the identity of the content is made by comparing the URI 51*f* contained in the first type of DD, the title 51*k*, and vendor name 51*h*. Of course, for example, another parameter, such as data type, may be used for the comparison.

Next, the download control program 43*a* transmits a content download request or a sub-content download request to the CSV 2 (STEP S61*g*). When the CSV 2 receives the request from the MS 3, download control program 23*a* of the CSV 2 transmits the content or the sub-content to the MS 3 (STEP S61*h*).

When the MS 3 receives the content or the sub-content from the CSV 2, the download control program 43*a* checks whether the content or the sub-content downloaded completely or not (STEP S61*i*). If the download control program 43*a* detects that the content or the sub-content has been downloaded completely, then the download control program 43*a* stores the downloaded content or sub-content into the memory 46 and transmits a success notification to a server by utilizing the success-failure URI 51*g* contained in the DD. Further, the download control program 43*a* displays the information obtained from a server by utilizing the display URI 51*h* (STEP S61*j*).

On the other hand, if the download control program 43*a* detects that the content or the sub-content has been downloaded incompletely, then the download control program transmits a failure notification to the server by utilizing the success-failure URI 51*g*.

Figure 9:
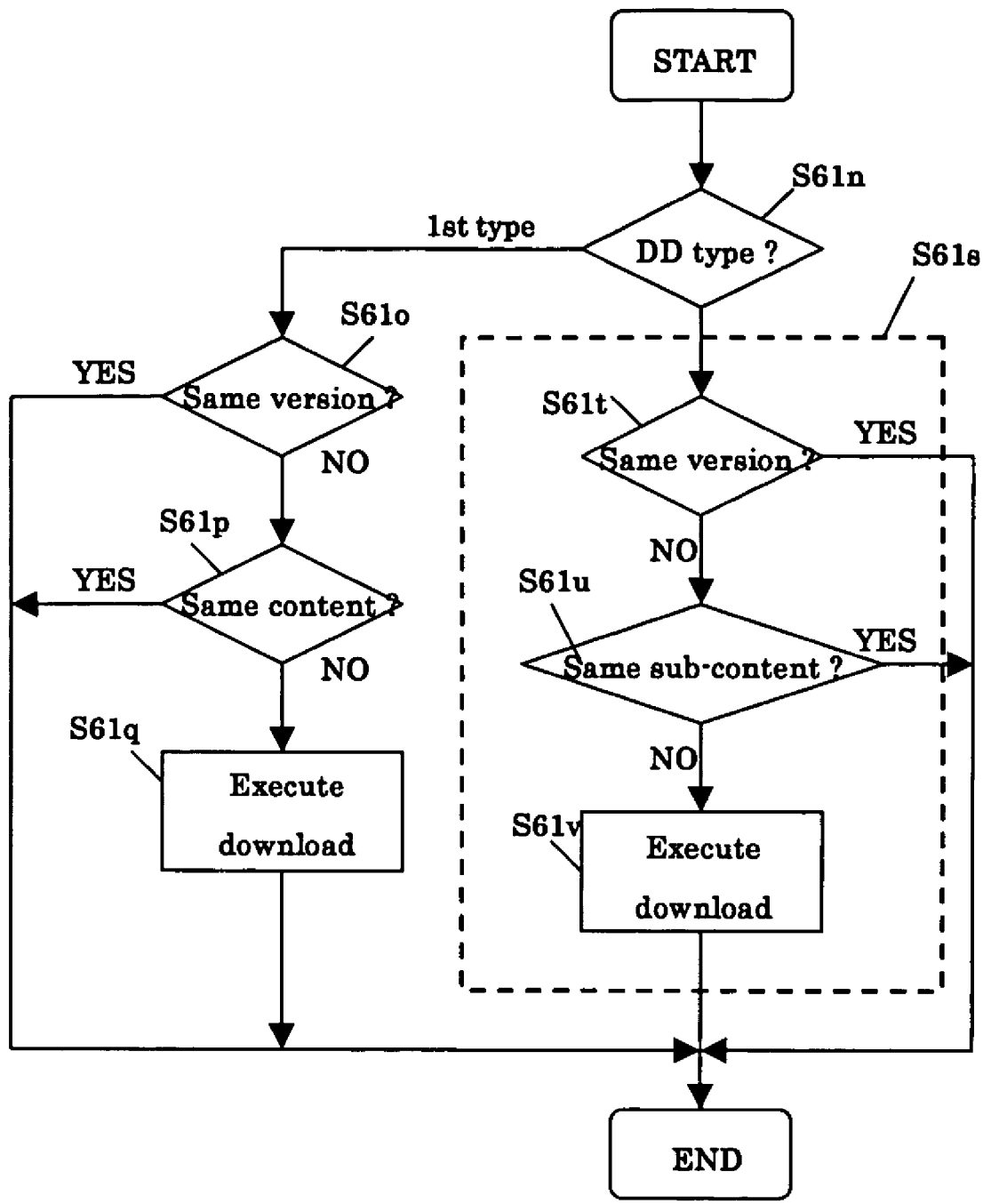
FIG. 9 shows a sequence of a part of download processing performed by the download system of the first embodiment.

Now, the judgment whether the download control program 43*a* downloads the content or sub-content will be explained more detail. FIG. 9 shows an operation of the download control program regarding the STEP S61*f*.

Firstly, the type of DD is checked (STEP S61*n*). If the DD is the first type of DD, the version 51*i* of the received DD and the version 51*i* of the DD stored in the memory 46 are compared (STEP S61*o*) and it is recognized that the content designated by the received first type of DD has been updated in a case where the comparison result indicates disagreement. In this instance, download control program 43*a* further checks whether there is a same content as designated by the received first type of DD in the memory 46 downloaded by utilizing the second type of DD or the third type of DD (STEP S61*p*). That is, it is checked whether there is a second type of DD or a third type of DD, in the memory 46, which has the same URI 51*f*, version 51*i*, title 51*k*, and vendor name 51*n* as the received first type of DD. Moreover, the revision date 51*j* may be used for the comparison in place of the version 51*k*.

Furthermore, it is also possible to check whether the content is updated by the data type 51d or the size 51e.

If it is judged that there is no content in the memory 46 coincident with the content designated by the received first type of DD at STEP S61p, the download control program 43a decides that the content designated by the received first type of DD should be downloaded.

On the other hand, if it is judged that there is a DD which has the same version as that of the received first type of DD, at STEP S61o, or if it is judged that there is the same content in the memory 46 as the content designated by the received first type of DD, at STEP S61p, then the download control program 43a judges that the content designated by the received first type of DD need not be downloaded.

Now back to STEP S61n. If the DD from the DSV 1 is a second type of DD or a third type of DD, it is judged whether each sub-content or each object is to be downloaded or not (STEP S61s).

If the DD received from the CSV 1 is the second type of DD, comparison is executed by using version 52e contained in the object DDs (STEP S61t). In this case, the revision date 52f, data type 52b, and the size 52c can be used for the comparison.

If there is no object DD which has the same version as that contained in the received object DD, it is checked that there is the same object in the memory 46 as that designated by the received object DD (STEP S61u). This check is executed by using the URI 52d, the version 52e, title 52g, and vendor name 52i, and the download control program 43a decides that the object(s) should be downloaded in a case where there is no object in the memory 46 coincident with the object designated by the object DD.

On the other hand, at STEP S61t, if version 52e contained in the received object DD coincides with the version 52e contained in the DD in the memory 46 or, at STEP 61u, if there is the same object in the memory 46 as that designated by the received object DD, the download control program 43a decides that the object designated by the received object DD need not to be downloaded.

Also, at STEP S61u, if there is the same object in the memory 46 as that designated by the object DD, the download control program 43a adds information, indicating that this object is utilized by the content designated by this second type of DD, to this object. Then, this object will not be deleted except for complete deletion of this content.

On the other hand, at STEP S61n, if the DD received from the DSV 1 is the third type of DD, the download control program 43a executes operations designated by STEP S61s (STEP 61t to STEP 61v). In this instance, the judgment whether a sub-content is to be downloaded or not is handled by comparing the version 52e contained in the subcontent DD received from the DSV 1 and version 52e contained in the Sub-content DD in the memory 46.

Second Embodiment

Figure 10:
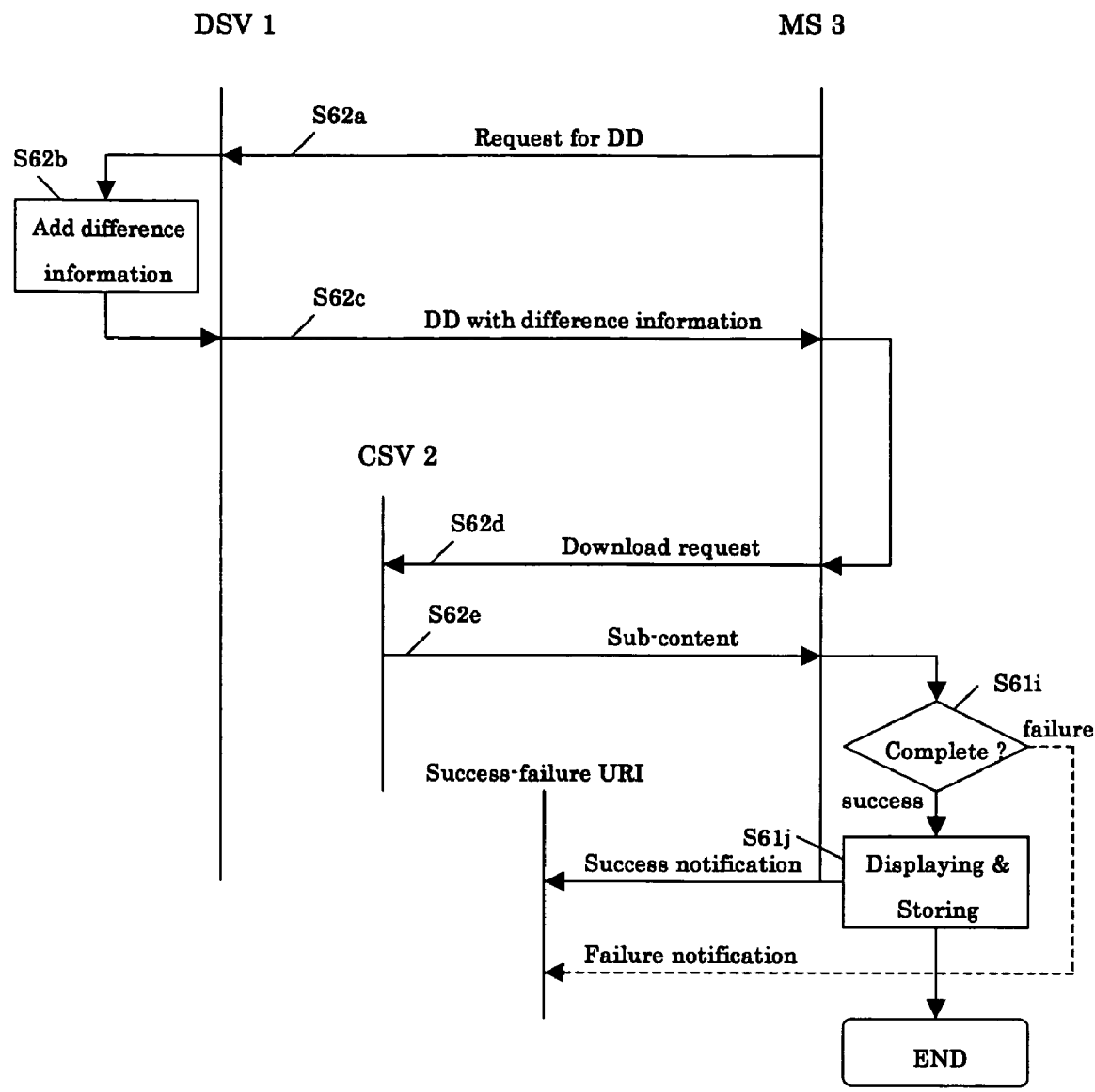
FIG. 10 shows a sequence of download processing performed by the download system of the second embodiment.

FIG. 10 shows the operation of the download system of the second embodiment. When a content download request, which relates to the contents stored in the memory 46, is inputted by operating the input unit 44, the download control program 43a is activated. After that, a DD download request is transmitted from the MS 3 to the DSV 1 (STEP S62a). The DD download request includes a DD from the memory 46 that corresponds to the requested DD.

When the DSV 1 receives the DD download request from the MS 3, the DD generation program 13a extracts the DD from the request and compares the extracted DD and the DDs stored in the data memory 14 (STEP S62b). If any information of the DD from the MS 3 does not coincide with information of the DD stored in the data memory 14, the DD generation program 13a transmits the DD with difference information indicating that this DD has different information from the DD readout from the data memory 14 (STEP S62c).

Also, the version 51i is used for the comparison described above if the DD received from the MS 3 is the first type of DD. Further, the version 52e or 53e contained in the object DD or the sub-content DD is used for the comparison if the DD received from the MS 3 is the second type of DD or the third type of DD.

If the MS 3 receives the DD from the DSV 1, the download control program 43a checks whether the DD has the difference information added thereto. If it is detected that the DD has the difference information added thereto, the download control program 43a transmits a content download request to the CSV 2 (STEP S62d).

When the CSV 2 receives the content download request from the MS 3, download control program 23a of the CSV 2 reads out a content or a sub-content from the data memory 24 and transmits the content or the sub-content to the MS 3 (STEP S62e).

When the MS 3 downloads the requested content or sub-content, the download control program 43a performs the same processes as step S61i to step S61j shown in FIG. 8.

Third Embodiment

Figure 11:
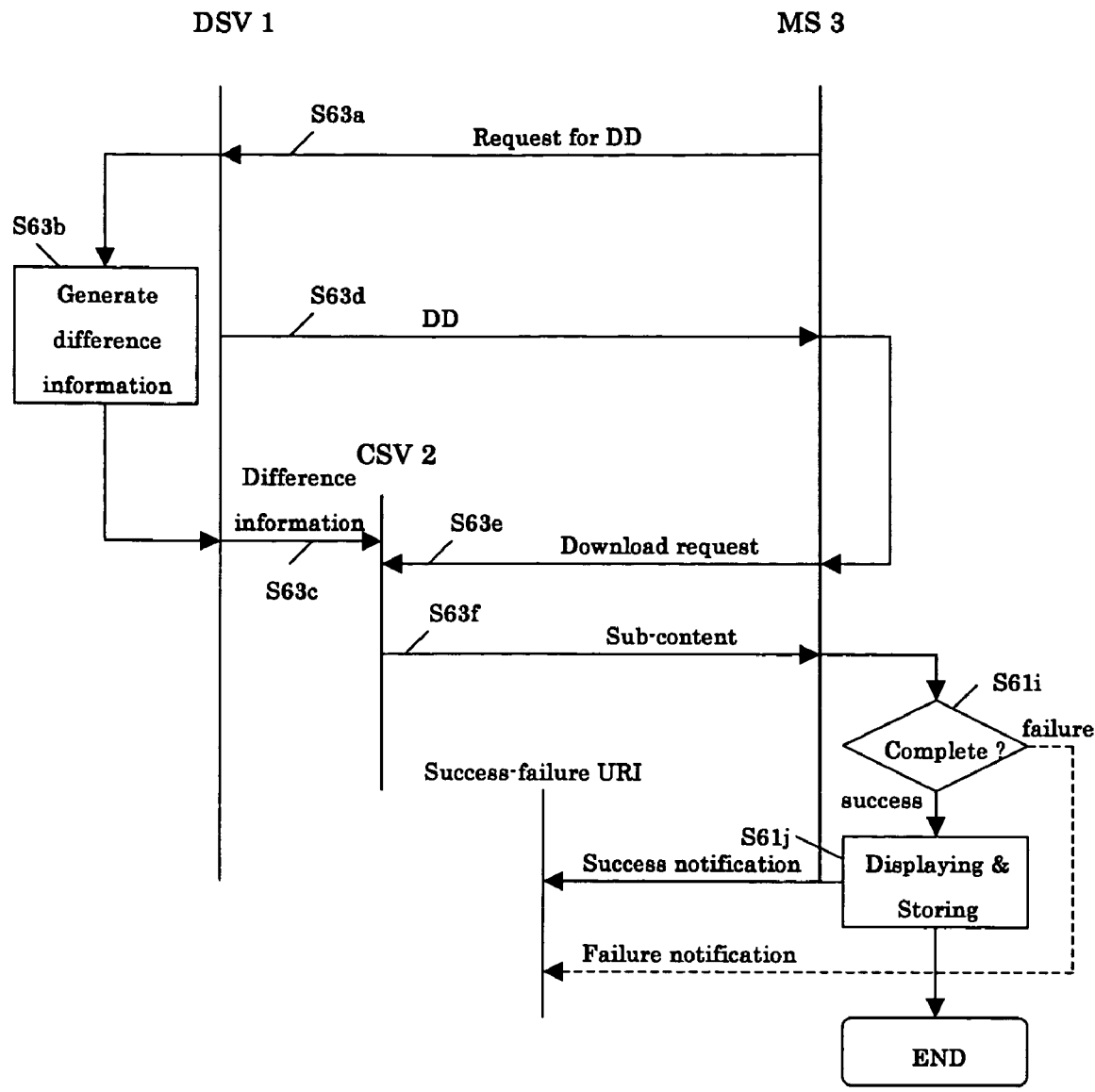
FIG. 11 shows a sequence of download processing performed by the download system of the third embodiment.

FIG. 11 shows the operation of the download system of the third embodiment. When a content download request, which relates to the contents stored in the memory 46, is inputted by operating the input unit 44, the download control program 43a is activated. After that, a DD download request is transmitted from the MS 3 to the DSV 1 (STEP S63a). The DD download request includes a DD from the memory 46 that corresponds to the requested DD.

When the DSV 1 receives the DD download request from the MS 3, the DD generation program 13a extracts the DD from the request and compares the extracted DD and the DDs stored in the data memory 14. If any information of the DD from the MS 3 does not coincide with information of the DD stored in the data memory 14, the DD generation program 13a generates a difference information which includes the DD identifier 51a and information indicating that there is any different information between the DD from the MS 3 and the DD read out from the data memory 14 (STEP S63b). And the generated difference information is transmitted to the CSV 2 (STEP S63c).

In the same way as described above, the version 51i is used for comparison if the DD received from the MS 3 is the first type of DD. Further, the version 52e or 53e contained in the object DD or the sub-content DD is used for the comparison if the DD received from the MS 3 is the second type of DD or the third type of DD. Also, the difference information includes the object identifier 52a if the DD is the second type of DD, and includes the content identifier 53a if the DD is the third type of DD.

Then, the DD generation program 13a reads out the DD from data memory 14 and transmits the DD to the MS 3 (STEP S63d).

When the MS 3 receives the DD from the DSV 1, the download control program 43a transmits a content download request to the CSV 2 based upon the DD from the DSV 1 (STEP S63e).

When the CSV 2 receives the request from the MS 3, the download control program 23a transmits a content (or contents) or a sub-content (or sub-contents), which coincides with the difference information from the DSV 1, based upon the request (STEP 631).

When the MS 3 downloads the requested content or sub-content from the CSV 2, the download control program 43*a* performs the same processes as step S61*i* to step S61*j* shown in FIG. 8.

Fourth Embodiment

Figure 12:
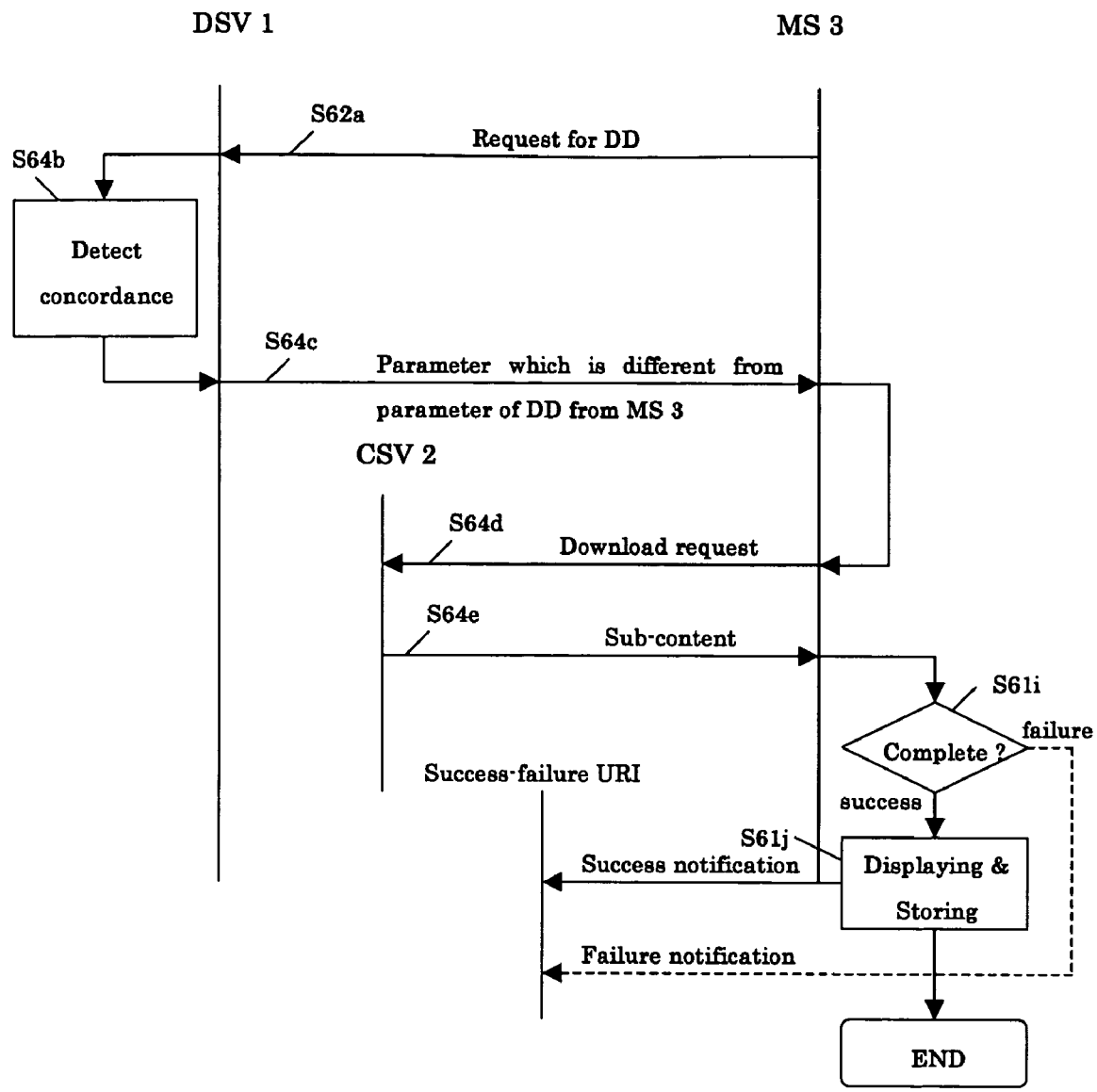
FIG. 12 shows a sequence of download processing performed by the download system of the forth embodiment.

FIG. 12 shows the operation of the download system of the fourth embodiment. When a content download request, which relates to the contents stored in the memory 46, is inputted by operating the input unit 44, the download control program 43*a* is activated. After that, a DD download request is transmitted from the MS 3 to the DSV 1 (STEP S64*a*). The DD download request includes a DD from the memory 46 that corresponds to the requested DD. When DSV 1 receives the request from the MS 3, the DD generation control program 13*a* compares the DD from the MS 3 and the DDs stored in the data memory 14 (STEP S64*b*). As a result of this comparison, if the DD generation program 13*a* detects that there is any difference between parameters in the received DD and parameters in the DD in the data memory 14, the DD generation control program 13*a* reads out the detected parameter from the data memory 14 and transmits the parameter to the MS 3 (STEP S64*c*).

Also, comparison of the DDs contained in the request from the MS 3 and the DDs stored in the data memory 14 is performed by the same processing as the already described method.

When the MS 3 receives the parameter from the DSV 1, the download control program 43*a* updates the DD in the memory 46 by using the parameter from the DSV 1, for example, by merging the DD and the parameter, and transmits a content download request to the CSV 2 based upon the at least one updated DD (STEP S64*d*). Then, the CSV 2 receives the content download request from the MS 3, and the download control program 23*a* reads out the content or the sub-content from the data memory 23 and transmits the content or the sub-content to the MS 3.

After the MS 3 receives the content or the sub-content from the CSV 2, the received content or sub-content is displayed on the LCD display unit and a reception notification is transmitted from the MS 3 by using the success-failure URI 51*g* (STEPS S61*i* and S61*j* described above).

Though it is described that the content includes an object of image and an object of voice, the content may include an object of voice and an object of melody. Further, the DSV 1 and the CSV 2 may consist of one server.

What is claimed is:

1. A client terminal used in a contents download system, comprising:
a storage unit configured to store a content, which includes a plurality of sub-contents, and a download descriptor, which contains a plurality of attribution information corresponding respectively to the sub-contents, said attribution information comprising version information of the corresponding sub-content;
a receiving unit configured to receive a download descriptor from a server; and
a comparing unit configured to compare the download descriptor stored in the storage unit with the download descriptor received from the server; and
a transmitting unit configured to transmit a request for at least one updated sub-content to the server, so as to download the at least one updated sub-content from the server, if the comparing unit determines that at least one sub-content of the content stored in the storage unit has been updated based on a comparison of at least the version information in the attribution information of the download descriptor stored in the storage unit with at least version information of attribution information in the download descriptor received from the server.

2. The client terminal according to claim 1, wherein the attribution information comprises identification information identifying the sub-content.

3. The client terminal according to claim 2, wherein the attribution information further comprises at least one of a title and a vendor name of the sub-content.

4. The client terminal according to claim 2, wherein the attribution information further comprises location information which is used for downloading the sub-content.

5. The client terminal according to claim 1, wherein one said download descriptor corresponds to one said content.

6. A client terminal used in a contents download system, comprising:
a storage unit configured to store a content, which includes a plurality of sub-contents, and a download descriptor, which contains a plurality of attribution information corresponding respectively to the sub-contents, said attribution information comprising version information of the corresponding sub-content;
a receiving unit configured to receive a download descriptor from a download server; and
a comparing unit configured to compare the download descriptor stored in the storage unit with the download descriptor received from the download server; and
a transmitting unit configured to transmit a request for at least one updated sub-content to a content server, so as to download the at least one updated sub-content from the content server, if the comparing unit determines that at least one sub-content of the content stored in the storage unit has been updated based on a comparison of at least the version information in the attribution information of the download descriptor stored in the storage unit with at least version information of attribution information in the download descriptor received from the download server.

7. The client terminal according to claim 6, wherein the attribution information comprises identification information identifying the sub-content.

8. The client terminal according to claim 7, wherein the attribution information further comprises at least one of a title and a vendor name of the sub-content.

9. The client terminal according to claim 7, wherein the attribution information further comprises location information which is used for downloading the sub-content.

10. The client terminal according to claim 6, wherein one said download descriptor corresponds to one said content.

11. A client terminal used in a contents download system, comprising:
a storage unit configured to store a content, which includes a plurality of sub-contents, and a download descriptor, which contains a plurality of attribution information corresponding respectively to the sub-contents, said attribution information comprising a title of the sub-content and a version of the sub-content;
a first transmitting unit configured to transmit a request for a download descriptor to a download server;
a receiving unit configured to receive the download descriptor from the download server;
a comparing unit configured to compare the title and version in the attribution information of the download descriptor stored in the storage unit with a title and a version in attribution information of the received download descriptor; and a second transmitting unit configured to transmit a request for a sub-content to a content server if the comparing means detects a difference between the title and version in the attribution information, for the sub-content, of the download descriptor stored in the storage unit and the title and version in the attribution information, for the sub-content, of the received download descriptor.

12. The client terminal according to claim 11, wherein the attribution information further comprises a vendor name of a vendor of the sub-content, and the comparing means also compares the vendor name in the attribution information, for the sub-content, of the download descriptor stored in the storage unit with a vendor name in attribution information, for the sub-content, of the received download descriptor.

13. The client terminal according to claim 11, wherein the attribution information further comprises location information which is used for downloading the sub-content.

14. The client terminal according to claim 11, wherein one said download descriptor corresponds to one said content.

* * * * *